US009167847B2

(12) United States Patent
Sengupta et al.

(10) Patent No.: US 9,167,847 B2
(45) Date of Patent: *Oct. 27, 2015

(54) PRODUCTION OF COATED TOBACCO PARTICLES SUITABLE FOR USAGE IN A SMOKELESS TOBACOO PRODUCT

(75) Inventors: Tapashi Sengupta, Barrington,, IL (US); Douglas A. Fernandez, Richmond, VA (US); Munmaya K. Mishra, Manakin Sabot, VA (US); William R. Sweeney, Richmond, VA (US); Szu-Sung Yang, Midlothian, VA (US)

(73) Assignee: Philip Morris USA Inc., Richmond, VA (US)

( * ) Notice: Subject to any disclaimer, the term of this patent is extended or adjusted under 35 U.S.C. 154(b) by 751 days.

This patent is subject to a terminal disclaimer.

(21) Appl. No.: 12/791,440

(22) Filed: Jun. 1, 2010

(65) Prior Publication Data
US 2011/0083681 A1    Apr. 14, 2011

Related U.S. Application Data

(63) Continuation of application No. 12/577,058, filed on Oct. 9, 2009, now abandoned.

(51) Int. Cl.
A24B 15/18      (2006.01)
(52) U.S. Cl.
CPC ................... *A24B 15/186* (2013.01)
(58) Field of Classification Search
CPC ........ A24B 15/00; A24B 15/186; A23B 7/16; B01J 13/10
See application file for complete search history.

(56) References Cited

U.S. PATENT DOCUMENTS

| 1,234,279 A | 7/1917 | Buchanan |
| 1,376,586 A | 5/1921 | Schwartz |
| 3,111,127 A | 11/1963 | Jarboe |
| 3,435,829 A * | 4/1969 | Seligman et al. ............. 131/370 |
| 4,018,233 A | 4/1977 | Miyake |
| 4,109,663 A | 8/1978 | Maeda et al. |
| 4,276,312 A | 6/1981 | Merritt |

(Continued)

FOREIGN PATENT DOCUMENTS

EP        1371410 A1 *  12/2003
WO    WO03/028492 A1    4/2003

(Continued)

OTHER PUBLICATIONS

Weinbreck, Fanny, "Whey protein/gum arabic coacervates: structure and dynamics", 2004, Utrecht University (The Netherlands).*

(Continued)

*Primary Examiner* — Michael J Felton
(74) *Attorney, Agent, or Firm* — Buchanan, Ingersoll & Rooney PC

(57) ABSTRACT

A process for preparing coated particles of a plant material includes: (a) combining plant material particles and a protein in a liquid medium, wherein the protein adsorbs onto at least a portion of a surface of the particles to form a first layer; and (b) mixing a polysaccharide including a pectin with the liquid medium, so that the polysaccharide adsorbs onto at least a portion of a surface of the first layer to form a second layer. In addition, a palatable product comprising at least one coated particle prepared by this process is described.

17 Claims, 7 Drawing Sheets

(56) References Cited

U.S. PATENT DOCUMENTS

| | | | |
|---|---|---|---|
| 4,446,165 | A | 5/1984 | Roberts |
| 4,515,769 | A | 5/1985 | Merritt et al. |
| 4,789,516 | A | 12/1988 | Lim |
| 4,806,356 | A | 2/1989 | Shaw |
| 4,861,627 | A | 8/1989 | Mathiowitz et al. |
| 5,104,674 | A | 4/1992 | Chen et al. |
| 5,186,185 | A | 2/1993 | Mashiko et al. |
| 5,370,139 | A | 12/1994 | Shu et al. |
| 5,525,351 | A | 6/1996 | Dam |
| 5,692,525 | A | 12/1997 | Counts et al. |
| 5,725,865 | A | 3/1998 | Mane et al. |
| 5,752,529 | A | 5/1998 | Mane et al. |
| 5,788,991 | A | 8/1998 | Nastke et al. |
| 5,827,531 | A | 10/1998 | Morrison et al. |
| 5,962,662 | A | 10/1999 | Shu et al. |
| 6,073,062 | A | 6/2000 | Hoshino et al. |
| 6,323,306 | B1 | 11/2001 | Song et al. |
| 6,325,859 | B1 | 12/2001 | De Roos et al. |
| 6,428,624 | B1 | 8/2002 | Coleman, III et al. |
| 6,458,404 | B1 | 10/2002 | Adachi |
| 6,676,959 | B1 | 1/2004 | Andersson et al. |
| 6,703,062 | B1 | 3/2004 | Appleqvist et al. |
| 6,845,777 | B2 | 1/2005 | Pera |
| 6,884,906 | B2 | 4/2005 | Dewis et al. |
| 7,032,601 | B2 | 4/2006 | Atchley et al. |
| 2003/0070687 | A1 | 4/2003 | Atchley et al. |
| 2004/0101543 | A1 | 5/2004 | Liu et al. |
| 2004/0118422 | A1 | 6/2004 | Lundin et al. |
| 2005/0000528 | A1 | 1/2005 | Bereman |
| 2005/0061339 | A1 | 3/2005 | Hansson et al. |
| 2005/0067726 | A1 | 3/2005 | Yan et al. |
| 2005/0172976 | A1 | 8/2005 | Newman et al. |
| 2005/0244521 | A1 | 11/2005 | Strickland et al. |
| 2005/0260266 | A1 | 11/2005 | Gebreselassie et al. |
| 2006/0090769 | A1 | 5/2006 | Woodson et al. |
| 2006/0165990 | A1 | 7/2006 | Curtis et al. |
| 2006/0191548 | A1 | 8/2006 | Strickland et al. |
| 2007/0000505 | A1 | 1/2007 | Zhuang et al. |
| 2007/0082094 | A1 | 4/2007 | McClements et al. |
| 2007/0186941 | A1 | 8/2007 | Holton, Jr. et al. |
| 2009/0014018 | A1 | 1/2009 | Sengupta et al. |
| 2009/0301505 | A1 | 12/2009 | Liu et al. |

FOREIGN PATENT DOCUMENTS

| | | |
|---|---|---|
| WO | WO 2007/073188 A1 | 6/2007 |
| WO | WO2008/075945 A | 6/2008 |
| WO | WO2008146176 A2 * | 12/2008 |

OTHER PUBLICATIONS

Turgeon, S.L. et al., "Protein-polysaccharide complexes and coacervates", Current Opinion in Colloid and Interface Science, London, GB, vol. 12, No. 4-5, Oct. 1, 2007, pp. 166-178.
International Search Report and Written Opinion dated Mar. 28, 2011 for PCT/EP2010/006197.
Commonly Assigned U.S. Appl. No. 12/155,227, filed May 30, 2008.
International Search Report and Written Opinion mailed Jul. 15, 2009 for PCT/IB2008/002533.
International Preliminary Report on Patentability (Form PCT/IB/373) and the Written Opinion of the International Searching Authority (Form PCT/ISA/237) issued on Apr. 11, 2012, in the corresponding International Application No. PCT/EP2010/006197. (7 page).

* cited by examiner

PRODUCTION OF COATED TOBACCO PARTICLES SUITABLE FOR USAGE IN A SMOKELESS TOBACOO PRODUCT

CROSS REFERENCE TO RELATED APPLICATION

This application is a continuation application of U.S. application Ser. No. 12/577,058 entitled COLLOIDAL PLANT POWDER/EXTRACT ENCAPSULATION WITH PECTIN-PROTEIN COACERVATE GELS, filed on Oct. 9, 2009 now abandoned, the entire content of which is hereby incorporated by reference.

BACKGROUND

Some users of orally-enjoyed plant material including chewing tobacco and/or snuff compositions notice certain negative flavor characteristics associated with bitterness, astringency, acridness, and/or aftertaste; thus there is perceived a need to overcome these negative taste characteristics.

A related disclosure exists in the commonly-assigned U.S. application Ser. No. 12/155,227 filed on May 30, 2008.

SUMMARY

In one embodiment, a process is provided for preparing coated plant particles, comprising combining particles of finely-divided plant material with one or more proteins in a liquid medium, under conditions effective to adsorb the protein onto at least a portion of a surface of the particles to form a first layer; and mixing one or more polysaccharide compositions comprising a pectin with the liquid medium, under conditions effective to adsorb at least some of the pectin onto at least a portion of a surface of the first layer to form a second layer, thereby forming coated particles of plant material.

In another embodiment, a coated particle of plant material is provided, comprising a base particle of finely-divided plant material; a first layer at least partially coating the base particle, the first layer comprising a protein; and a second layer at least partially coating the first layer, the second layer comprising a polysaccharide composition including a pectin.

In yet another embodiment, the coated particle is such that (1) the base particle has a largest dimension of less than about 3 mm in size; (2) the coated particle comprises (a) plant material in an amount of about 10 to about 90% by dry weight, (b) the first layer in an amount of about 1% to about 20% by dry weight, and/or (c) the second layer in an amount of about 5% to about 50% by dry weight; (3) the coated particle has a moisture content of less than about 15% by weight; and/or (4) the coated particle has a net negative or neutral charge; or a combination thereof.

In a particular embodiment described herein, the finely divided particles of plant material can be formed from finely ground tobacco particles coated with tobacco-sourced proteins and tobacco-sourced polysaccharides, such as tobacco-sourced pectins. This embodiment, by relying on tobacco sources for certain of the biopolymer coatings, increases the net tobacco content of the product, and thereby provides a cost savings resulting from use of tobacco plant products that might otherwise be wasted.

DETAILED DESCRIPTION

Figure 1A:
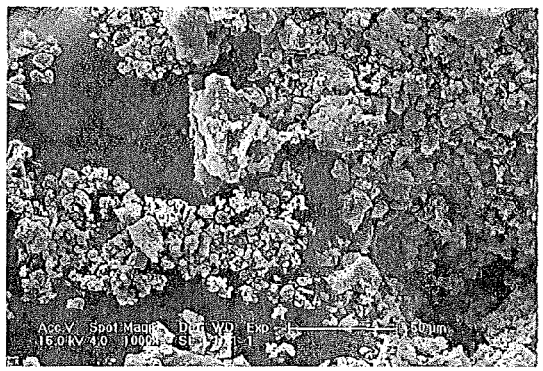
FIGS. 1a, 1b, 1c, and 1d are Environmental Scanning Electron Microscope (ESEM) images of coated tobacco particles prepared according to Example 1 herein.
Figure 1B:
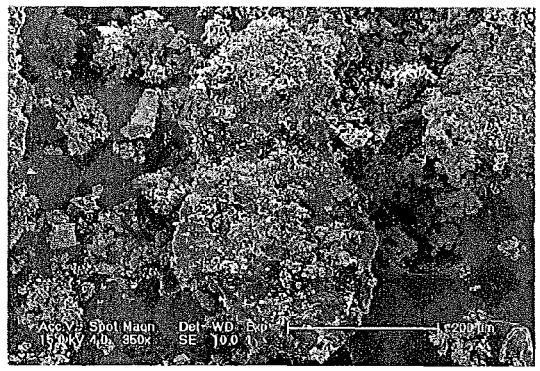
Figure 1C:
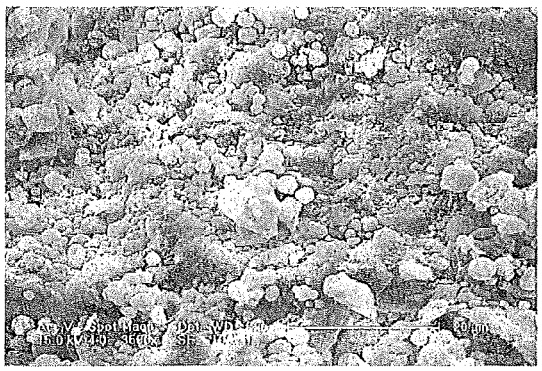
Figure 1D:
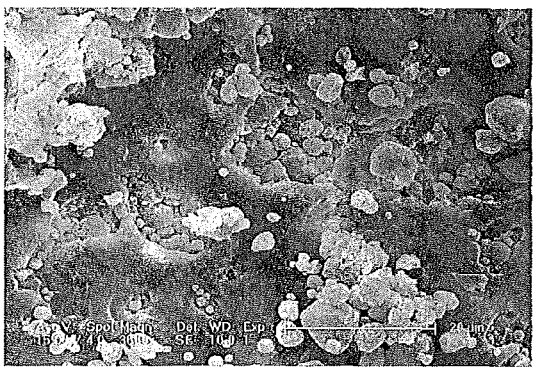
Figure 2A:
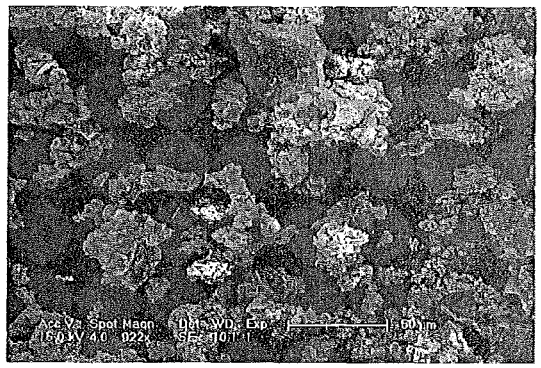
FIGS. 2a, 2b, 2c, 2d, and 2e are ESEM images of coated tobacco particles prepared according to Example 2 herein.
Figure 2B:
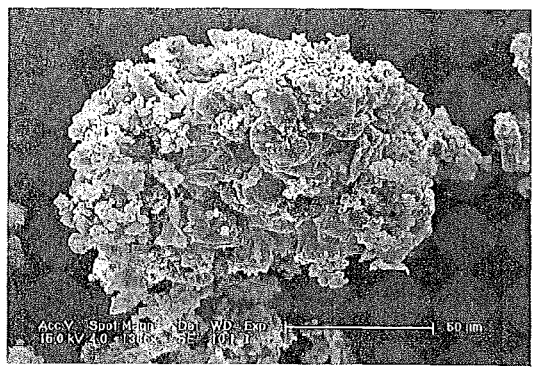
Figure 2C:
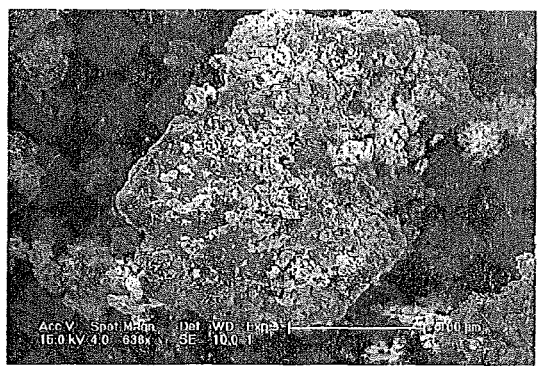
Figure 2D:
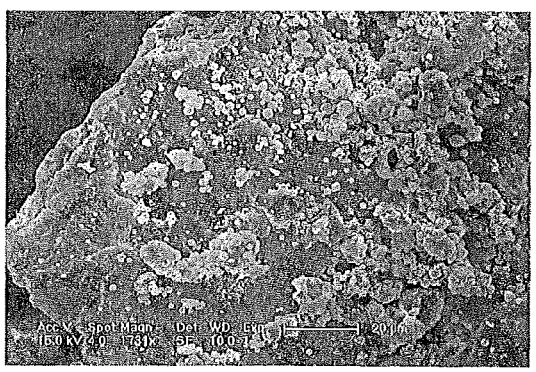
Figure 2E:
Figure 3A:
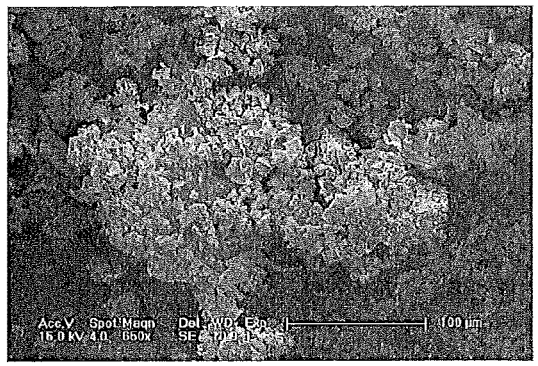
FIGS. 3a, 3b, 3c, 3d, 3e, and 3f are ESEM images of coated tobacco particles prepared according to Example 3 herein.
Figure 3B:
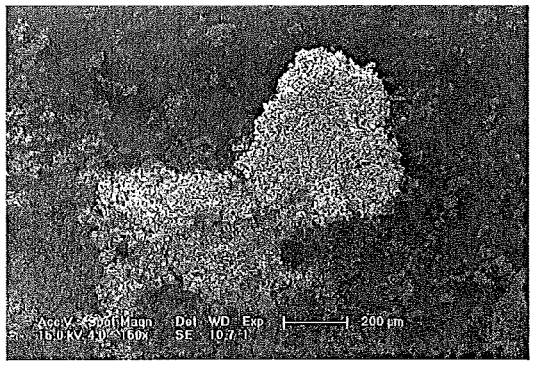
Figure 3C:
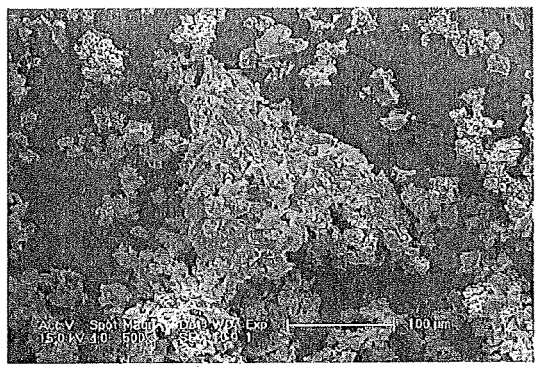
Figure 3D:
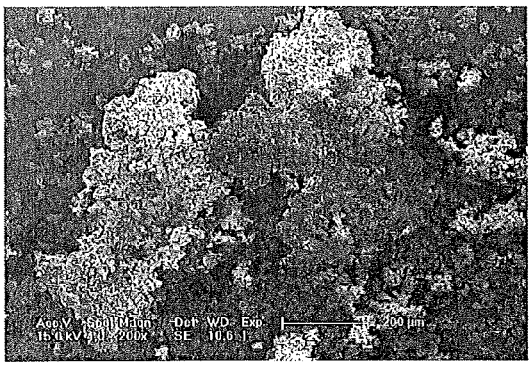
Figure 3E:
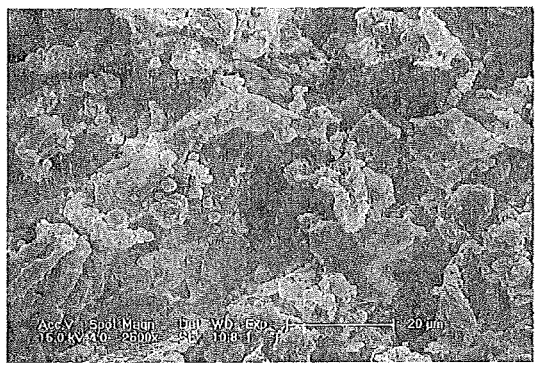
Figure 3F:
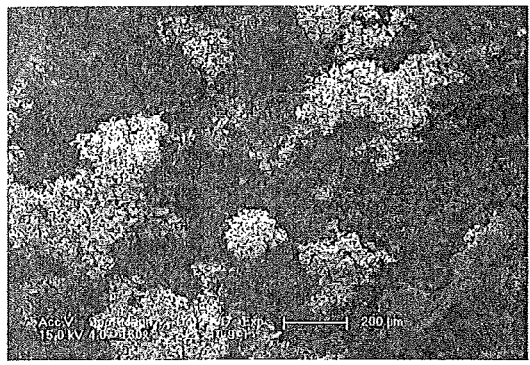
Figure 4A:
FIGS. 4a, 4b, 4c, 4d, and 4e are ESEM images of coated tobacco particles prepared according to Example 4 herein.
Figure 4B:
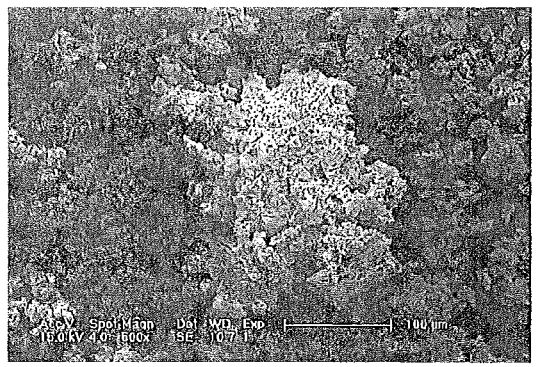
Figure 4C:
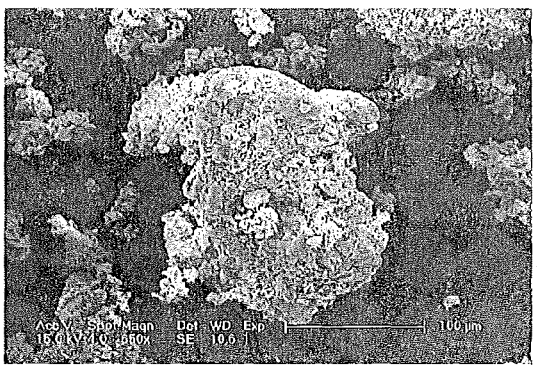
Figure 4D:
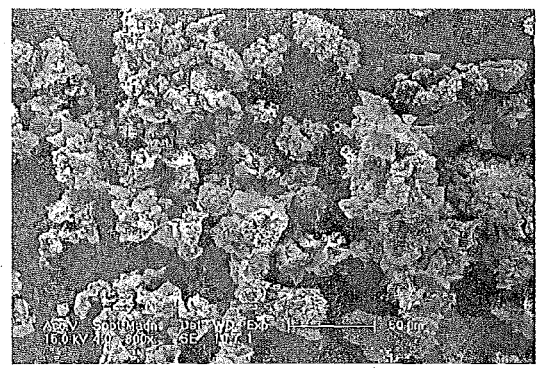
Figure 4E:
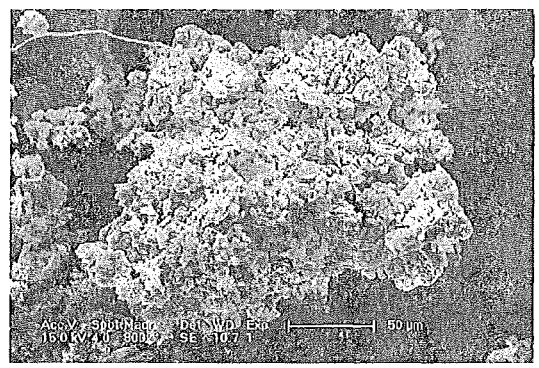
Figure 5A:
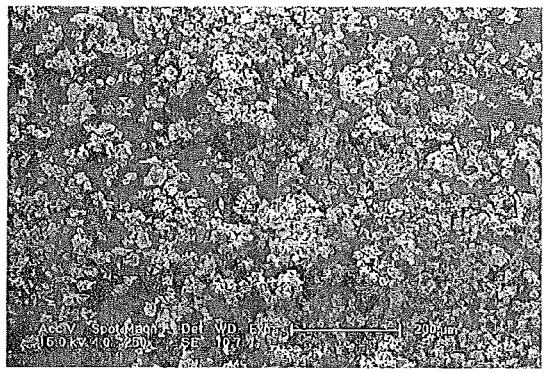
FIGS. 5a, 5b, 5c, and 5d are ESEM images of coated tobacco particles prepared according to Example 5 herein.
Figure 5B:
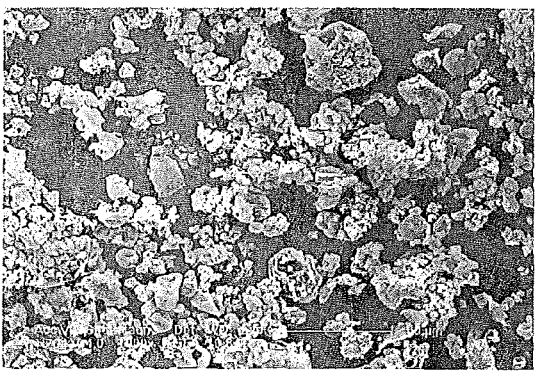
Figure 5C:
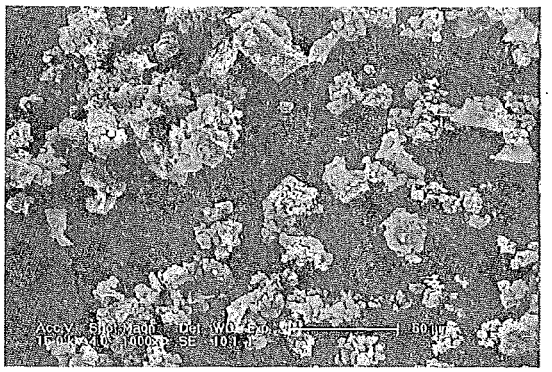
Figure 5D:
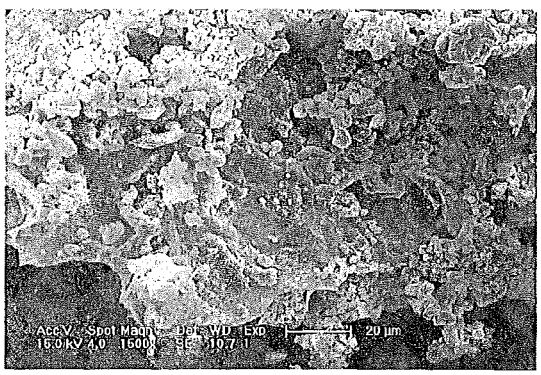

The present application describes processes for preparing particles of plant material, in particular ground tobacco particles, coated with polysaccharide-protein coacervate gels, and in particular with pectin-protein coacervate gels.

It may be advantageous to coat plant materials for use in orally utilized compositions in order to improve the acceptability of the product to the consumer. Such a coating should improve the "mouth feel," taste, texture, appearance, smell, flavor and/or flavor delivery, or other attributes of the plant material, and thereby make the product more acceptable to the user.

Plant materials that may be encapsulated include smokeless tobaccos, comprising chewing tobacco, snus, dry snuff, and moist snuff. Some users of chewing tobacco and/or snuff compositions notice certain negative flavor characteristics associated with bitterness, astringency, acridness, flavor harshness, and/or aftertaste: thus there is perceived a need to treat the compositions with a variety of flavors to overcome the negative taste characteristics sometimes associated with them.

The coated particles described herein are beneficial because the palatable or comestible products containing them can take a variety of different forms, including chewable and non-chewable edible forms, such as in the form of a tablet, stick, strip (which may be more or less flexible), snus, pouched product, chewable gum, spongy material, or combinations of these.

Because the coated particles possess a neutral aesthetic color, as opposed to the deep brown color of, e.g., ground tobacco particles, they can be incorporated into these different products without the need for added colorants. The coated particles also exhibit reduced odor compared to, e.g., uncoated tobacco particles. Additionally, a coating as described herein may provide for improved cohesion in the case of a product incorporating compressed plant material.

Moreover, when the coated particles are in the mouth, they swell upon mixture with saliva, creating a pleasant mouthfeel, and reducing certain undesired physiological sensations, such as throat itching, that can sometimes be observed when uncoated tobacco products are used. The particles provide a mild, creamy flavor and texture that combines particularly well with other food ingredients, such as sugars, starches, polyols, oils, lipids, waxes, fats, fatty acids, glycerides, etc.

The coated particles provide relatively slow, controlled release of flavors from the plant material, and provide a means for modifying the flavorant release by control of shell integrity, shell thickness, and gel strength. In a particular embodiment, where the pectins at least partially contain those obtained from tobacco materials, economic efficiencies from the use of tobacco-sourced materials are obtained as well, since they can replace biopolymers that might otherwise result in greater costs.

As used herein, the term "coacervate" is used in the sense understood by a person skilled in the art, and denotes aggregations of molecules held together via non-covalent interactions such as electrostatic, van der Weals and hydrophobic attractive forces, etc. In a more particular embodiment, the term coacervate is used to denote the aggregation of molecules on the surface of one or more particles of plant material, such as tobacco particles, that are held to an aggregation of protein molecules (typically electrostatically charged) that form a coating on at least part of the surface and form a first layer. These protein molecules in turn are held to an aggregation of polysaccharide molecules, containing one or more pectins, more particularly containing one or more pectins derived from tobacco plants, that form a coating on at least part of the surface of the first layer, thereby forming a second layer.

As used herein, the term "particle" denotes a relatively small, subdivided unit of material, which may be in one or more of a variety of regular or irregular shapes. The term is intended to include powders, granules, shreds, and elongated structures, such as whiskers, fibers, and the like. The term is also intended to include droplets, e.g., droplets of liquid plant extract.

As used herein, the term "colloidal" is reasonably understood by a person skilled in the art and may generally mean "having the nature of a colloid." A "colloid" refers to a system in which finely divided particles, which are approximately 10 to 10,000 angstroms in size, are dispersed within a continuous medium in a manner that prevents them from being filtered easily or settled rapidly.

As used herein, the term "finely divided" denotes to possess an average size of about 3 mm or less. To "finely divide" a material includes treating by comminution, pulverization, grinding, cutting, shredding, and the like, to produce a finely divided material.

As used herein, the term "about" when used in conjunction with a stated numerical value or range has the meaning reasonably ascribed to it by a person skilled in the art, i.e. denoting somewhat more or somewhat less than the stated value or range, to within a range of ±10% of the stated value.

Plant Material Particles

Any plant material typically consumed by humans or animals can be coated by the methods described herein. Particularly suitable plant materials include tobacco and tobacco substitutes. The plant materials are generally in particulate form, and are preferably under 3 mm in size, more preferably under 1000 microns in size.

Suitable particles of plant material may include, or be derived from, any part of a plant, such as leaf, stem, flower, fruit, nut, bean, bark, root, and the like. The term "derived from," as used herein, is intended to include any materials obtained by processing plant part(s) itself, such as extract fractions of a plant (e.g., an extract of a tobacco plant) or parts thereof. The particles may be in any suitable form including, but not limited to, shreds, granules and powders, and can have any desired shape, such as different regular and irregular shapes. Suitable regular shapes may include round, square, rectangular, oval, other polygonal shapes, cylindrical, fibrous, and the like.

In one embodiment, the particles of plant material can include ground (including micronized) powders, such as tobacco powders. Preferably, the particles can have a diameter less than about 3 mm, and more preferably less than about 1000 microns, and even more preferably, between about 0.2 microns and about 250 microns, and most preferably, between about 1 microns and about 100 microns. In a further embodiment, the particles can include ground or micronized particles of sufficient size that they can form a colloidal suspension of particles in a liquid medium, more particularly in an aqueous medium, such as water.

In a particular embodiment, the particles of plant material can be electrostatically charged, Zwitterionic, or neutral. Electrostatically charged particles can more easily attract and hold one or more proteins to form a coacervate. If the ground plant material does not have the desired innate charge for attracting the protein coating material, the particles may be treated to alter the charge thereof before being mixed with the protein coating material, as described in more detail herein. In a particular embodiment, the particles can desirably have a negative overall electrostatic charge. Ground tobacco particles generally have a net negative electrostatic charge if untreated.

Protein

A variety of proteins can be used to form the coacervate described herein. Examples of suitable proteins include proteins from animal or plant sources, such as milk proteins, whey proteins, rice proteins, wheat proteins, soy proteins, corn proteins, egg white proteins, protein fractions from tobacco or tobacco extracts, fish protein, gelatins, protein hydrolyzates, and the like. Examples of suitable gelatins may include, but are not limited to, fish gelatin, beef gelatin, pork gelatin, and gelatin hydrolyzates. These proteins may be used individually or in combinations thereof. In a preferred embodiment, the protein includes a protein obtained from a tobacco source, such as extracted tobacco plant material, or a tobacco extract.

Desirably, the protein is rich in the amino acids lysine, asparagine, glutamine, and/or arginine.

In a particular embodiment, the protein desirably has a molecular weight ranging between about 2 KDaltons and about 1000 KDaltons, and preferably, between about 15 KDaltons and about 500 KDaltons.

The protein coating material can have an overall electrostatic charge, or can be Zwitterionic or neutral. It is desirable to select a protein coating material that has an electrostatic charge that will be attracted to, and will attract, the charge possessed by the tobacco particles. Charges on the protein can also facilitate electrostatic complexation between the protein-coated particle and a subsequent polysaccharide coating, thereby helping to form the coacervate. In one embodiment, the protein coating material can be Zwitterionic or cationic in the case where the tobacco material has an overall negative electrostatic charge. The electrostatic charge on the protein can be modified by placing the protein in an aqueous solution, and adjusting the pH of the solution until the desired charge is obtained. The pH adjustment necessary and the resulting electrostatic charge obtained depend, to some extent, on the pKa of the protein side chains. For example, acidifying the protein solution (so that pH<pKa of the acidic and basic side chains) will generally place a net positive electrostatic charge on the protein, while making the protein solution more alkaline (pH>pKa of the acidic and basic side chains) will generally result in proteins having a net negative electrostatic charge.

Polysaccharide

The term "polysaccharide," as used herein, is intended to include a polysaccharide, an oligosaccharide or a mixture of these, which can form a coacervate with a protein. In a particular embodiment, the polysaccharide includes one or more pectins. Other materials that can be present in the polysaccharide composition in addition to pectin include chitosan, modified cationic polysaccharides, amidated pectins, and amidated starches containing amino groups, carrageenans, alginates, gums, such as gellan gum, gum Arabic, gum tragacanth, locust bean gum, or xanthan gum, carboxymethylcellulose, anionically modified starches or celluosic materials containing carboxy groups, nonionic agar, or curdlans.

Pectins are relatively high molecular weight polyuronide substances found naturally in varying concentrations in fruit or plants, and consisting chiefly of partially methoxylated galacturonic acids linked together to form long chains. Pectins are often obtained in the form of solid powders or concentrated syrups, and are capable of gelation at room temperature. They are generally soluble in water and insoluble in most organic solvents. Pectins are often obtained by dilute acid extraction of plant material, in particular from the rind of fruits, such as citrus fruits, or from fruit pomace, which is the solid remains of fruit (which may include pulp, peel, seeds, and stalks) after pressing for juice.

Examples of suitable pectins may include, but are not limited to, pectins from tobacco sources, apple pomace, citrus peel, plums, or gooseberries, or combinations of these. Preferably, the pectin includes a pectin from a tobacco source. Pectins can form coacervates with the proteins forming the first layer of coating on the particle without the need for the addition of salts.

The polysaccharide composition forms a second layer of the coating of the particle by forming a coacervate with the protein contained in the first layer. If this second layer is the outermost coating layer, the polysaccharide composition should be chosen so as to optimize its swelling behavior and visco-elasticity under physiological pH and temperature conditions, in order to control the kinetics of extraction from the particulate plant material. The coated particle should also remain stably coated for a time generally ranging from about 10 minutes to 20 minutes when exposed to saliva.

Control of the kinetics of extraction can be exercised primarily by manipulating the gel strength of the polysaccharide. Gel strength can be controlled by, e.g., controlling the molecular weight, polydispersity, degree of esterification, degree of pectin amidation (in particular, the degree of amidation of tobacco-derived pectins), combining pectins with carageenans, and/or by manipulating the processing of the coated particles, and in particular, the order of addition of polysaccharides and/or proteins.

In a particular embodiment, the suitable polysaccharide generally have a molecular weight ranging between about 5 KDaltons and about 1,000 KDaltons, preferably between about 100 KDaltons and about 500 KDaltons, and more preferably, between about 200 KDaltons and about 500 KDaltons. Preferably, the polysaccharide used as a coating material should be substantially free of salts, sugars or hemicelluloses, (e.g., compounds with a molecular weight of between about 1 KDaltons to about 5 KDaltons), and should be non-standardized (i.e., supplied in a form without additives).

The polysaccharide coating material can be ionic, Zwitterionic, or neutral. In one embodiment, the polysaccharide coating material can be Zwitterionic or anionic. A polysaccharide having a net negative electrostatic charge is desirable because it forms a stable coacervate with a positively charged protein layer. The charge on the polysaccharide, if desired, can be manipulated by, for example, adjusting the pH of the liquid medium containing the polysaccharide.

Additional polysaccharides may also be included in the polysaccharide composition. These can include materials such as anionic gelling polysaccharides, such as other pectins and carrageenans, and/or can include nonionic gelling polysaccharides, such as curdlan, agar, and/or locust bean gum. Other polysaccharides that can be included are one or more of gum arabic, carboxymethyl cellulose (CMC), sodium alginates, gum tragacanth, gellan gum, xanthan gum, and combinations of these. Additional polysaccharides, which preferably include a carrageenan, more preferably, a κ-carageenan, can be added in the form of an outer polysaccharide layer disposed on top of a pectin layer, or can form part of the pectin layer itself. In either case, the strength of the coating layer (and its coating efficiency) can be modified by introducing, e.g., a κ-carageenan into the coating materials in an amount ranging between about 10 wt % and about 60 wt %, based on the total polysaccharide in the first and second layers. Addition of such polysaccharides can provide control over the kinetics of release of flavors from the plant material particles by providing better gel strength, and by improving encapsulation efficiency.

Physical properties of several types of pectin suitable for use herein as the polysaccharide are provided in Table 1 below.

TABLE 1

Physical Property Data for Pectins

| Pectin | Description | Intrinsic viscosity (dl/g) | Huggins coefficient | Solvent conditions | pH | MW |
|---|---|---|---|---|---|---|
| Sigma apple pectin | 6% ester, low ester pectin | 5.8556 | 0.0643 | Good draining | 3.389 | 613,740 |
| Genu Pectin Type X-916-02 | Amidated low ester pectin, 17% amidation, 34% ester, no sugar | 4.9261 | 0.8462 | Poor solvent conditions | 2.984 | 479,760 |
| Genu Pectin Type LM 18-CG-Z | Around 40% ester, no sugar | 3.6156 | 0.827 | Poor, non-draining | 3.052 | 376,300 |
| Tobacco pectin (unwashed) | Very low ester pectin | 1.881 | 0.4154 | Very good draining | 2.983 | 259,530 |
| Tobacco pectin (dialyzed) | Very low ester pectin | 1.3514 | 0.02749 | Very good draining | 4.420 | 237,270 |

Among the above pectins, gel strength in a protein-pectin coacervate has been found to generally decrease in the order Genu Pectin Type LM 18-CG-Z>Genu Pectin Type X-916-02>Sigma apple pectin>Tobacco pectin. Increased molecular weight and an ester content of about 30 to 40% are believed to help promote a strong gel network, in the absence of salt as a crosslinking agent. Network formation in the coacervate is believed to be favored by interactions between the amino groups of the protein and carboxylic groups of the pectins.

Moreover, the polymer-solvent interactions of the above pectins have been found to be significantly different from each other, as indicated by the difference in Huggins coefficients. These differences may be attributable to the degree of branching of the pectins, as well as the levels of esterification and/or amidation. A Huggins coefficient of between about 0.6 and 0.9, preferably about 0.8, has been found to be particularly desirable for pectin-protein coacervate gel formation.

Coating Process

In one embodiment, particles of plant materials, such as tobacco particles, and a protein can be combined by combining the particles, or a colloidal dispersion of the particles in a dispersing medium, with a dispersion or solution of the protein coating material to form a first mixture. In a particular embodiment, the dispersing medium can be an aqueous medium containing water, and in a more particular embodiment, is deionized water. In a particular embodiment, the protein content in the liquid medium may be about 0.5% to about 2% by weight, based on the total weight of the resulting mixture.

The particles of plant material are typically naturally negatively-charged. However, if the particles are not negatively-charged as obtained, they may be treated with appropriate reagents to impart a negative charge to the particles before they are mixed with the protein coating material. For example, particles may be treated with an appropriate amount of one or more bases such as sodium carbonate, sodium bicarbonate, and/or sodium hydroxide (such as lye), to impart a negative charge to at least some of the particle surfaces.

Desirably, the surface of the uncoated particles attracts protein, via electrostatic attraction, for example. The protein deposits onto at least a portion of a surface of the particles, thereby forming a first layer of a coating. Preferably, the protein forms a layer substantially covering the entire surface of at least some of the particles, and desirably of the majority, or substantially all, of the particles. The thickness of this first layer may be uniform or non-uniform.

The net electrostatic charge of the protein, if desired, can be manipulated by, for example, adjusting the pH value of a liquid medium in which the protein is suspended or dissolved. This can aid in deposition of the protein onto the particle surface, as described above. In one embodiment, materials can be added to lower the pH of the liquid medium containing the protein, thereby imparting a positive charge on the protein. Suitable pH lowering materials include weak organic acids, such as acetic acid, adipic acid, fumaric acid, malic acid, lactic acid, tartaric acid, or gluconic acid and glucono delta lactone, strong food grade hydrochloric acid, and mixtures of these. In a particular embodiment, food-grade materials are used to adjust pH. In another embodiment, a positively charged protein can be prepared by coating a solid protein material with one or more of the acids mentioned above.

Once a coacervate has formed between the particles of plant material and the protein, the resulting protein-coated particles can then be contacted with a polysaccharide composition, either by adding the polysaccharide to the protein-coated particles, or by adding the protein-coated plant particles to the polysaccharide coating material.

In embodiments where the polysaccharide is added to the protein-coated particles, or where the protein-coated plant particles are added to the polysaccharide, the overall electrical charge of the protein coating on the plant particles can be altered by adjusting the pH of the liquid medium prior to mixing of the protein-coated particles with the polysaccharide coating material. Suitable substances for adjusting the pH may include either acids and bases, e.g., weak organic acids such as acetic acid, adipic acid, fumaric acid, malic acid, lactic acid, tartaric acid, gluconic acids and glucono delta lactone or strong inorganic acids, such as food grade hydrochloric acid, or bases such as sodium carbonate, sodium bicarbonate or sodium hydroxide. In one embodiment, the protein coating can be treated with an acid to impart a positive charge to at least some of the surface of the protein coating, thereby facilitating electrostatic attraction of the polysaccharide coating material. For example, the pH of the first mixture containing the protein-coated plant particles may be adjusted to about 3.5 to about 6.0 with an acid, such as citric acid, although the precise acid used and amount of pH adjustment obtained will depend to some extent on the protein used.

In an embodiment, the polysaccharide composition may be mixed with the protein and with uncoated particles in the form of a suspension or solution. Because of the respective electrostatic attractions and repulsions, the protein can deposit onto at least a portion of the surface of the particles and the polysaccharide can deposit onto at least a portion of a surface of the deposited protein, thereby form a two-layer coating.

In any of the embodiments described herein, the thickness of the protein and/or polysaccharide coating may be uniform or non-uniform. Preferably, the polysaccharide forms a layer substantially covering the entire surface of the protein coating on the particles.

As indicated above, the polysaccharide desirably contains at least one pectin. The pectin can form a complex coacervate layer with the protein as a result of hydrophobic interactions and/or electrostatic complexation, in the presence or in the absence of a salt, which can help to crosslink the pectin layer, forming the pectin coating into a gel.

Alternatively, or in addition, the proteins in the first coating layer and/or the polysaccharides of the second coating layer can gel as a result of hydrogen bonding, hydrophobic interactions, electrostatic interactions, formation of salt bridges (e.g., monvalent, divalent, or trivalent cation-induced crosslinking resulting from the addition of, e.g., potassium, calcium, magnesium, and/or iron salts of chloride, citrate, lactate, acetates, and/or other counterions), van der Waals interactions under room temperature or below, or during hot processing conditions, or some combination of these.

Gelation may be induced by various methods, such as adjusting the pH of the liquid medium containing the particles; adding monovalent, divalent or trivalent cations to the liquid medium containing the particles (which, at the time of addition, may be uncoated, coated with protein, or coated with protein and polysaccharide); heating the particles to a temperature of between about 60° C. and about 90° C. for about 1 to about 3 hours; cooling the particles to a temperature of between about 20° C. and about 0° C. for about 1 to about 48 hours; removing at least part of the liquid medium from the coated particles by drying, e.g., by spray drying, freeze drying; or combinations of these procedures.

In a particular embodiment, a salt may be included along with the protein and/or the polysaccharide composition at least in part to further assist in formation and gelation of a coacervate layer from the pectin-containing polysaccharides and the protein. Examples of suitable salts may include, but are not limited to, monovalent, divalent or trivalent cations such as potassium, calcium, magnesium and iron, in the form of salts such as chloride, citrate, lactate or acetate salts. These salts may be used individually or in combination thereof. In a particular embodiment, a divalent salt, such as salts of calcium and magnesium, can be introduced during or after the addition of the polysaccharide composition to the particles. The resulting coated particle may have a net negative or neutral charge.

However, it has been found that the addition of such a salt is not necessary in order for gel formation to occur when a polysaccharide such as pectin is added to a protein layer. More specifically, gel formation is facilitated by specific interactions, believed to be between carboxylic groups of the polysaccharide and amino groups of the proteins (or between amino groups of the polysaccharide and carboxylic groups of the proteins). This is particularly true under processing conditions of 60-90° C. for 1-3 hours. The result of these interactions is that a polysaccharide-protein coacervate (and in particular, a pectin-protein coacervate) may gel without the addition of divalent metal cations, which have been expected to be necessary for pectin gelation. These interactions allow the gel strength of a pectin-protein coacervate to be modified and controlled by, e.g., varying the number of available carboxylic groups and/or amine groups of the pectin, depending upon the number of carboxyl groups or amine groups in the protein able to interact with them. This can be done by amidation or deamidation of carboxyl groups of the pectin, which can convert carboxyl groups to carboxamides, or the converse, respectively.

In a preferred embodiment, at least one of the polysaccharides can form a gel in the pH range between about 3 and about 9. Alternatively, or in addition, at least one of the polysaccharides can form a gel upon addition of monovalent, divalent or trivalent cations to the liquid medium during or after addition of the polysaccharide. Cations can be selected from the group consisting of potassium, calcium, magnesium, and/or iron, and can be introduced as chloride, citrate, lactate, and/or acetate salts that are added to the liquid medium during or after addition of the polysaccharides coating material to induce formation of the gel, e.g., via formation of salt bridges. As described herein, gelation may also be induced or aided by heating (e.g., to a temperature between about 60° C. and about 90° C., and preferably, between about 60° C. and about 80° C., for about 10 to about 180 minutes, and preferably, for about 60 to about 90 minutes). In particular, the use of, at least in part, commercially available pectins can reduce or eliminate the need for the addition of a salt, since such commercial pectins tend to gel immediately upon heating.

After formation, the gel may desirably be stabilized by cooling or maintaining it at a temperature below the temperature of gel formation, and preferably below room temperature, but above the freezing point of the gel, and typically between about 20° C. and about 0° C., and preferably, between about 15° C. and about 5° C., for about 1 to about 60 hours, and preferably, about 12 to about 48 hours.

It may also be advantageous to add one or more additional components or other additives during the processing to affect the "mouth feel," taste, texture, appearance, smell, flavor and flavor delivery and other attributes of the coated particles. These components may include, but are not limited to, the following: gum arabic, flavorants, colorants, sweeteners, such as xylitol, bulking agents, fillers, anti-adherent compounds, dispersing agents, moisture absorbing compounds, chemesthetic agents, such as warming agents or cooling agents, and film-forming agents. Other food ingredients, such as starches, polyols, oils, lipids, waxes, fats, fatty acids, glycerides, etc., may be also added to the coating to enhance the mouthfeel of the finished, dried product. Additives, such as flavorants, chemesthetic agents, throat-soothing agents, spices, warming agents, tooth-whitening agents, breath-freshening agents, vitamins, minerals, caffeine, drugs, and other actives may be included in any or all layers or portions of the coatings. Such components may be used in amounts sufficient to achieve their intended effects.

The process of forming the protein-polysaccharide coacervate coating, or steps thereof, may be repeated, if desired, by using the same or different coating materials as those described for the protein and polysaccharide coating materials, with or without the above-mentioned additional components or additives. A series of layers can therefore be built up around the particle of plant material, each of which may be the same or different from other layers, and which may provide desirable properties, such as varying flavorant or chemesthetic effect, to the user as the various layers of the coating come into contact with saliva.

By using the methods disclosed herein, the strength of the coating layers of the particles of plant materials described herein, and thus, the coating efficiency, can be controlled to achieve the desired release kinetics of flavorant from the plant material. In a particular embodiment, at least one of the polysaccharides in the second coating can form a gel in the pH range of about 3 to about 9. In this embodiment, additional gel formation in the second coating layer may further improve the coating strength. For instance, κ-carrageenan can form a relatively strong and rigid gel under similar pH conditions, and may be included in the polysaccharide coating material. The amount of κ-carrageenan, which is preferably incorporated in the coated particles in the range of about 10% to about 60% be weight, based on the total weight of the polysaccharides in the coated particles.

The strength of the coating on the particles may also be manipulated by modifying the above-described coating process. In particular, the outermost layer may be preferentially optimized in terms of the swelling behavior and visco-elasticity under physiological pH and temperature conditions, for controlling the extraction kinetics of materials from the coated particles.

In one embodiment of a method for making the coated particles of plant material described herein, a protein is added to particles of plant material in a liquid medium, forming a first layer thereon. This first layer can form on at least on a portion of a surface of the particles, and preferably substantially cover the entirely surface of the particles. Thereafter, a pectin can be to the protein-coated particles obtained in the first step. The added pectin can be adsorbed onto at least a portion of, and preferably all of, the surface of the first layer, to form a second layer. Preferably, this second coating layer substantially covers the entire surfaces of the first coating layer. At this stage, the pectin in the second coating layer may interact with the protein in the first coating layer, thereby forming coacervate. Further, κ-carrageenan can be added to the double coated particles and adsorb onto at least a portion of a surface of the second layer to form a third layer. Preferably, this third coating layer substantially covers the entire surfaces of the second coating layer. The thickness of the κ-carrageenan coating may be uniform or non-uniform. At this stage, κ-carrageenan in the third coating layer may form a gel under appropriate conditions, thereby forming the outermost relatively strong gel layer.

In a particular embodiment, the protein and polysaccharide composition can, if desired, be added to the particles of plant material simultaneously in a liquid medium. Because of the coacervation mechanism, the protein will preferentially form a first layer on the surface of the particles of plant material, while the polysaccharide will preferentially form a second layer on the protein layer.

Upon completion of the coating procedures, the mixture containing the coated particles may optionally be homogenized or otherwise processed. Following any such optional processing, the coated particles may then be dried to provide a material that comprises individual dried particles, or agglomerations of particles. Prior to, or as part of, the drying process, the liquid content of the mixture may be adjusted, e.g. to by removing large quantities of liquid, or by adding liquid. If the liquid is to be removed or reduced, it may be separated by customary means, such as decanting and filtering. Alternatively, if water and preferably deionized water may be added to the mixture to achieve the desired consistency for spray drying or freeze drying. For example, the final suspension may contain about 2 wt % of solids based on the total weight of the mixture.

If spray drying is utilized, for example, the suspension of coated particles can be atomized from a liquid feed into a spray of droplets, wherein the droplets can be placed in contact with drying air to form dry coated particles. As an alternative to spray drying, the coated particles can be passed through a tunnel drier at about 90° C. to about 95° C. to flash off a majority of the liquid, then air dried at room temperature to form final particles.

In a particular embodiment, the coated particles can desirably be dried to a moisture content of less than about 15%, preferably, about 2% to about 10%, and more preferably, about 2% to about 6%. Drying may be carried out by any suitable method, such as spraying drying, freeze-drying, fluidized bed drying, and vacuum-drying.

In a more particular embodiment, the method for making the coated particles described herein comprises: (a) dispersing a protein, which is positively charged, and particles of a plant material, such as a tobacco-containing powder, which is negatively charged, in an aqueous liquid, wherein the protein adsorbs onto the surfaces of the negatively charged particles; (b) adjusting the pH of the mixture of protein-coated particles and aqueous liquid to enhance the positive charge on the surface of the protein, and to promote complexation between the positively charged protein and the negatively charged polysaccharide in the next layer; (c) mixing of a polysaccharide composition, in the form of a solid, or solution, or both, in the aqueous liquid containing the protein-coated particles, heating this mixture to a temperature of about 60° C. to about 90° C. to dissolve the polysaccharide and promote interactions between the polysaccharide and protein; (d) optionally adding salts, such as potassium or calcium lactate, or other polyvalent metal salts, to act as crosslinking agents that promote gelation of the polysaccharide shell; (e) cooling the resulting mixture for about 24 to about 48 hours to promote gel formation via hydrogen bonding; and (f) removing water by, e.g., spray drying, freeze drying, or fluidized bed drying.

In certain embodiments, the final composition of the coated particles may contain, as weight percents based upon the dry weight of coated particles, about 10% to about 90% of plant material, more particularly about 20% to about 80%, and more particularly, about 40% to about 70% plant material. The first coating may comprise an amount of the coated particle ranging from about 1% to about 20%, more particularly about 1% to about 30%, even more particularly about 5% to about 15%, by weight based on the total dry weight of the coated particles. The second coating may comprise an amount of the coated particle ranging from about 1% to about 60%, more particularly about 15% to about 50%, even more particularly about 15 to about 40%, by weight based on the total weight of the coated particles.

The particle size of the particles, if they spray dried, can be anywhere from about 0.20 micron to about 4000 microns, preferably between 0.25 micron to about 1000 microns, more preferably between 0.3 micron and 250 microns, and even more preferably between 0.3 micron and 100 microns. In a particular embodiment, the coated particles include colloidal coated particles, and in particular, colloidal coated tobacco particles.

The processes described herein may also be used to coat selective components on droplets of an extract of a plant material, such as a tobacco extract liquid, to prepare coated particles which are essentially encapsulated droplets. In particular, the particles which can attract the coating materials will be selectively coated. Conversely, the particles which expel the coating materials may not be coated and thus remain in the liquid in their original form.

The coated particles, and in particular, coated tobacco particles, described herein may preferably have a net negative charge and a zeta potential value of about −5 mV to about −60 mV, more particularly from about to about −15 mV to about −40 mV, to prevent excessive agglomeration of particles and a gritty texture.

Once dried, the coated particles may be easily incorporated into a variety of different palatable or edible products. These palatable or edible products can take the form of a tablet, stick, chewable gum, spongy material, foam, cream, pelleted material, or fiber, or a form suitable to be contained in a pouch, or combinations of these. Examples of such palatable or edible products include chewable or non-chewable edible forms, including tablets, candies, gums, chocolates, flavored sponges, and the like.

The coated particles described herein can have a color lighter than that of the uncoated plant material. For example, coated tobacco particles can have a light beige color, which is lighter than the dark brownish color of raw tobacco materials, making the coated particles more aesthetically suitable for inclusion in neutral-colored edible systems.

Upon swelling and/or hydration, the coated particles may form a suspension of plant particles in the mouth, which can create a pleasant in-mouth feel, optionally in the presence of other food ingredients such as sugars, starches, polyols, oils, lipids, waxes, fats, fatty acids, glycerides, etc.

The release of selected compounds from the coated particles described herein may be triggered by simple diffusion into saliva, or may occur upon application of pressure by the tongue and/or teeth to the particles. For example, upon ordinary chewing or dipping of the product, the user will release flavorings or other attributes as hydration occurs. In the presence of the enzymes in the saliva, the pectin-protein coatings on the particles may be stable for a limited period of time, for example, about 10 minutes to about 20 minutes.

The time that the coating is stable in the mouth may be changed by selection of particular proteins/polysaccharides in the coatings and by modifying the other aspects of the coacervation process that affect gel strength, as described above. The extraction mechanics of the particles (for example, extraction of tobacco flavor) in the mouth may be altered by altering one or more of the following characteristics of the coatings: swelling behavior, visco-elasticity under physiological pH and temperature conditions, porosity, stability or rate of diffusion of ingredients under application of pressure by tongue or teeth or both, stability from dissolution upon attack from the enzymes in saliva, or combinations of these.

In addition, one or more of the following characteristics of the coatings can be optimized for controlling the mouth feel of the edible product: slipperiness, sliminess, firmness, sponginess, stability or rate of diffusion of ingredients under application of pressure by tongue or teeth or both, stability from dissolution upon attack from enzymes in saliva, or combinations of these. These properties can be varied by selecting different coating materials for the first and second coating materials, combining different coating materials, modifying the properties of coating materials, e.g., by crosslinking, or combinations of these.

The following Examples are provided to increase understanding of the processes and products described herein, and are not intended to limit the scope of the appended claims. Mean particle size is measured by wet state Horiba LA 910 light scattering. ESEM images are obtained by placing a sample of particles onto 12 mm diameter carbon adhesive disks attached to Al stubs, sputter coated with 20 nm of Au—Pd using a Cressington 208 HR Sputter Coater operating in Ar, and imaged using an FEI XL30 Environmental Scanning Electron Microscope operating at 15 kV in Hi-Vac mode.

Example 1

A gelatin/pectin coacervate gel encapsulated tobacco powder was prepared by dispersing in 91 g of deionized water 0.91 g of gelatin from porcine skin, type A, 300 Bloom as the protein, using a high shear Silverson mixer. 6.37 g of 400 mesh pasteurized ground burley tobacco was then dispersed into the gelatin mixture using the high shear mixer. 1.54 g of 0.5 M citric acid solution (Sigma, 99% pure) was then added to adjust the pH of the mixture to 4.2. 1.82 g of citrus peel pectin, 40% ester (CP Kelco Genu pectin LM-18-CG) as the polysaccharide was added slowly to deionized water heated to a temperature of 70-85° C. with continuous stirring, until all of the pectin was dissolved. The resulting viscous pectin solution was then added to the gelatin-tobacco dispersion under high shear over 20 minutes. The temperature of the dispersion was allowed to equilibrate with a water bath at 70-90° C. for 1-3 hours. 3 g of 0.153 M calcium lactate solution (Sigma, 90%) was then added, and the resulting dispersion was removed from the water bath and refrigerated for 24 hours. The resulting gel dispersion was homogenized with deionized water, and then spray dried using a spray drier having an inlet temperature of 200° C. and an outlet temperature of 110° C. The resulting encapsulated particles were collected in a sample collector, and were found to have a mean particle size of 35.973 μm. ESEM images of the coated particles at scales ranging from 350× to 3500× are shown in FIGS. 1a, 1b, 1c, 1d, 1e.

Example 2

A Na-caseinate/pectin coacervate gel encapsulated tobacco powder was produced by following the procedures described above in Example 1, with the following variations. 0.9 g of low fat Na-caseinate (from American Casein company) was used as the protein instead of gelatin. 6.4 g of 400 mesh pasteurized ground burley tobacco were used. 7.24 g of 0.5 M citric acid solution (Sigma, 99% pure) was used to adjust pH. 1.8 g of apple pectin, 6% ester (Sigma) was used as the polysaccharide. Calcium lactate was not added. The resulting sample was designated Sample 17-7B in Table 2 below. The coated particles were found to have a mean particle size of 42.419 μm, and are illustrated in the ESEM images of FIGS. 2a, 2b, 2c, 2d, and 2e, with magnifications of 638× to 3038×.

Example 3

A Na-caseinate/pectin coacervate gel encapsulated tobacco powder was prepared by following the procedures described above for Example 2, with the following variations. 0.91 g of low fat Na-caseinate (from American Casein company) was used as the protein. 7.2 g of 0.5 M citric acid solution (Sigma, 99% pure) was used to adjust pH. 1.82 g of amidated low ester pectin (Genu pectin X-916-02 from CP Kelco, non-standardized) was used as the polysaccharide. The resulting sample was designated Sample 17-35 in Table 2 below. The coated particles were found to have a mean particle size of 70.925 μm, and are illustrated in the ESEM images of FIGS. 3a, 3b, 3c, 3d, 3e, and 3f, with magnifications of 150× to 2500×.

Example 4

A Na-caseinate/pectin coacervate gel encapsulated tobacco powder was prepared by following the procedures described above for Example 3, with the following variations. 1.82 g of low ester (about 40%) pectin (Genu pectin LM18 CG-Z from CP Kelco, non-standardized) was used as the polysaccharide. The resulting sample was designated Sample 17-36 in Table 2 below. The coated particles were found to have a mean particle size of 45.777 μm, and are illustrated in the ESEM images of FIGS. 4a, 4b, 4c, 4d, and 4e, with magnifications of 150× to 800×.

Example 5

A soy isolate/pectin coacervate gel encapsulated tobacco powder was prepared by following the procedures described above for Example 2, with the following variations. 0.91 g of soy isolate (Solae company, Supro EX 38) was used as the protein. 7 g of 0.5 M citric acid solution (Sigma, 99% pure) was used as to adjust pH. 1.82 g of apple pectin, 6% ester (Sigma) was used as the polysaccharide. The resulting sample was designated Sample 17-25 in Table 2 below. The coated particles were found to have a mean particle size of 32.974 μm, and are illustrated in the ESEM images of FIGS. 5a, 5b, 5c, and 5d, with magnifications of 250× to 1500×.

Example 6

Figure 6A:
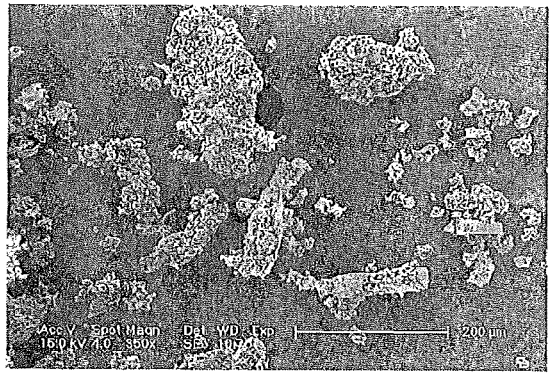
FIGS. 6a, 6b, 6c, 6d, and 6e are ESEM images of coated tobacco particles prepared according to Example 6 herein.
Figure 6B:
Figure 6C:
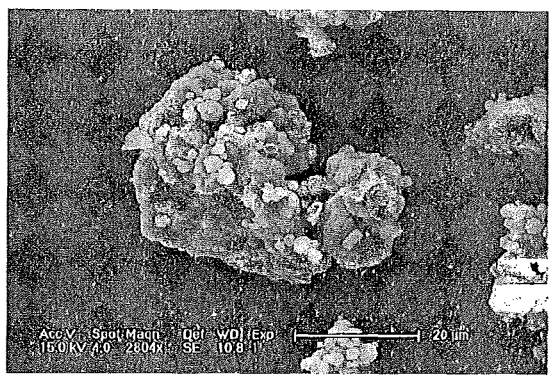
Figure 6D:
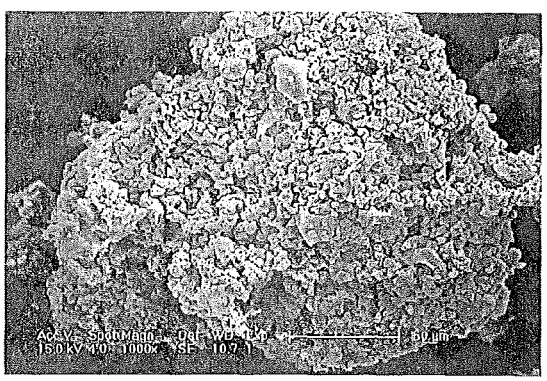
Figure 6E:
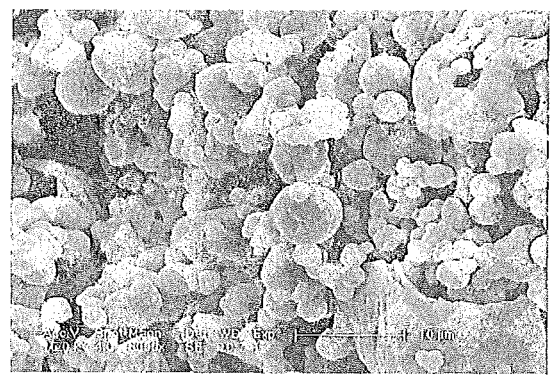
Figure 7A:
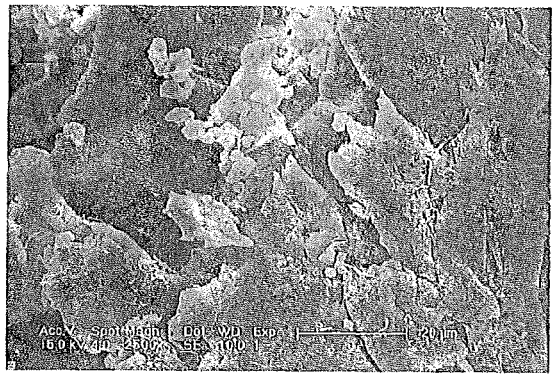
FIGS. 7a, 7b, 7c, 7d, and 7e are ESEM images of coated tobacco particles prepared according to Example 10 herein.
Figure 7B:
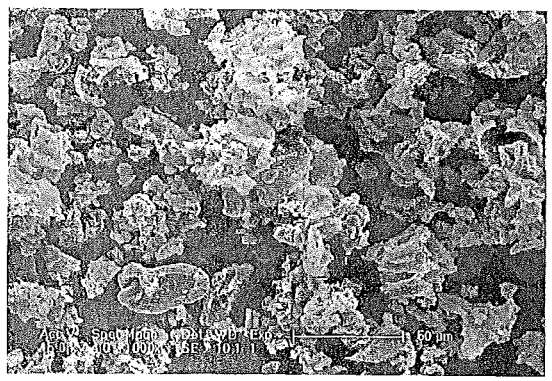
Figure 7C:
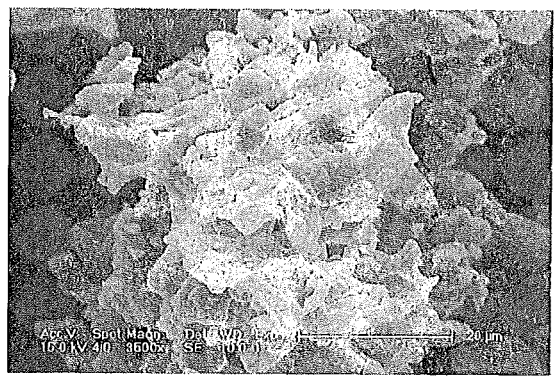
Figure 7D:
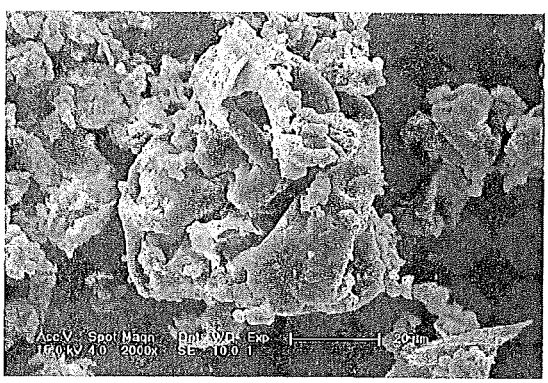
Figure 7E:
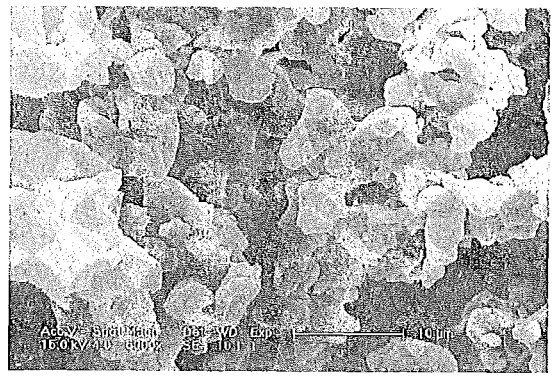

A lysozyme/pectin coacervate gel encapsulated tobacco powder was prepared by following the procedures described above for Example 2, with the following variations. 0.91 g of lysozyme from chicken egg white (Sigma, 99%) was used as the protein. 5.24 g of 0.5 M citric acid solution (Sigma, 99% pure) was used to adjust pH to 5.2. 1.82 g of apple pectin, 6% ester (Sigma) was used as the polysaccharide. The resulting sample was designated Sample 17-13 in Table 2 below. The coated particles were found to have a mean particle size of 76.89 μm, and are illustrated in ESEM images at scales ranging from 1000× to 5000× in FIGS. 6a, 6b, 6c, 6d, and 6e, where FIG. 6e is a magnification of the portion of FIG. 6d marked by a box.

Example 7

An ovalbumin/pectin coacervate gel encapsulated tobacco powder was prepared by following the procedures described above for Example 2, with the following variations. 0.91 g of ovalbumin from chicken egg white (Sigma, 99%) was used as the protein. 7.49 g of 0.5 M citric acid solution (Sigma, 99% pure) was used to adjust pH. 1.82 g of apple pectin, 6% ester (Sigma) was used as the polysaccharide. The resulting sample was designated Sample 17-15 in Table 2 below.

Example 8

A beta-lactoglobulin/pectin coacervate gel encapsulated tobacco powder was prepared by following the procedures described above for Example 2, with the following variations. 0.91 g of beta-lactoglobulin (Davisco) was used as the protein. 7.53 g of 0.5 M citric acid solution (Sigma, 99% pure) was used to adjust pH. 1.82 g of apple pectin, 6% ester (Sigma) was used as the polysaccharide. The resulting sample was designated Sample 17-17 in Table 2 below.

Example 9

A whey protein isolate/pectin coacervate gel encapsulated tobacco powder was prepared by following the procedures described above for Example 2, with the following variations. 0.91 g of whey protein isolate (Bi Pro JE 365-5-420, Davisco) was used as the protein. 9.1 g of 0.5 M citric acid solution (Sigma, 99% pure) was used to adjust pH. 1.82 g of apple pectin, 6% ester (Sigma) was used as the polysaccharide. The resulting sample was designated Sample 17-31 in Table 2 below.

Example 10

A soy isolate/pectin coacervate gel encapsulated tobacco powder was prepared by following the procedures described above for Example 1, with the following variations. 0.91 g of soy isolate (Solae company, Supro EX 38) was used as the protein. 6.5 g of 0.5 M citric acid solution (Sigma, 99% pure) was used to adjust pH. 1.87 g of tobacco sourced pectin (undialyzed) was used as the polysaccharide. 2.77 g of 0.153 M calcium lactate solution (Sigma, 90%) was added. The resulting sample was designated Sample 17-49 in Table 2 below. The coated particles were found to have a mean particle size of 42.873 μm, and are illustrated in the ESEM images at scales ranging from 1000× to 5000× in FIGS. 7a, 7b, 7c, 7d, and 7e.

Example 11

A soy isolate/pectin coacervate gel encapsulated tobacco powder was prepared by following the procedures described above for Example 1, with the following variations. 0.91 g of soy isolate (Solae company, Supro EX 38) was used as the protein. 3.3 g of 0.5 M Citric acid solution (Sigma, 99% pure) was used to adjust pH. 1.87 g of tobacco sourced pectin (dialyzed and freeze dried) was used as the polysaccharide. 2.77 g of 0.153 M calcium lactate solution (Sigma, 90%) was used as in Example 1. The resulting sample was designated Sample 17-39 in Table 2 below.

Example 12

A tobacco sourced protein/pectin coacervate gel encapsulated tobacco powder was prepared by following the procedures described above for Example 1, with the following variations. 0.86 g of tobacco sourced protein (Philip Morris Company) was dispersed into 86.13 g of deionized water. 6.10 g of 400 mesh ground burley tobacco was used as the tobacco particles. 5.17 g of 0.5 M citric acid solution (Sigma, 99% pure) was used to adjust pH to 4.2. 1.74 g of 40% ester pectin (Genu pectin LM-18-CG-Z) was used as the polysaccharide.

Comparative Example 1

A soy isolate/κ-carrageenan coacervate gel encapsulated tobacco powder was prepared by following the procedures described above for Example 1, with the following variations. 0.91 g of a soy isolate (Solae company, Supro EX-38) was used as the protein. 9.02 g of a 0.5 M citric acid solution (Sigma, 99% pure) was used to adjust the pH to 4.2. 1.82 g of κ-carrageenan (FMC Biopolymers Gelcarin 911 NF) was used as the polysaccharide. 0.32 g of 0.153 M calcium lactate solution (Sigma, 90%) was used as a crosslinking agent.

The above process may be varied slightly by adding the κ-carrageenan powder directly into the batch, mixing well, and then equilibrating in the water bath for 1-3 hours at 60° C.-90° C. to solubilize the κ-carrageenan and facilitate specific interactions and ionic crosslinking among the carrageenan and protein molecules. This eliminates an extra step of making the carrageenan solution separately, which was extremely viscous and was difficult to handle.

The resulting sample was designate Sample 17-92 in Table 2 and Table 3 below.

Samples of material obtained from several of the examples described above were tested in order to evaluate the rheological properties of the gels using an AR 1000-N rheometer from TA Instruments. During this testing, a linear visco-elastic region was first established conducting the strain sweep at 1 Hz. A frequency sweep was then performed at 0.1% strain. Because all of the gels were visco-elastic, their shear modulus was a complex modulus G*, which contained contribution from a storage or elastic component G', which represents the strength of the gel network, and a loss or viscous modulus G", which represents the liquid-like properties of the gel. G* can be related to these contributions by the formula:

$$G^{*2}=G'^{2}+G''^{2}$$

In addition, the ratio of the loss modulus component and the storage modulus component can be represented by the parameter δ, wherein:

$$\delta=\tan^{-1}(G''/G')$$

Preferably, δ ranges from about 5 to about 11. More preferably, δ is between from about 6 to about 10.

Higher values of G' indicate a stronger, firmer gel network, and a results in a lower loss ratio, δ. Conversely, lower values of G' indicate a softer gel. Preferably, G' ranges from about 10,000 Pa to about 35,000 Pa.

TABLE 2

Rheological data on protein-carbohydrate coacervate gels at 1 Hz, 0.1% strain

| Sample # | G' Pa | G" Pa | δ = tan$^{-1}$ G"/G' | Salt added | visual observations | protein | carbohydrate |
|---|---|---|---|---|---|---|---|
| 17-92 | 33770 | 2993.3 | 5.063 | 0.32 g calcium lactate | firm gel, can be cut | Soy isolate (Supro Ex 38) | κ-carrageenan |

TABLE 2-continued

Rheological data on protein-carbohydrate coacervate gels at 1 Hz, 0.1% strain

| Sample # | G' Pa | G" Pa | $\delta = \tan^{-1}$ G"/G' | Salt added | visual observations | protein | carbohydrate |
|---|---|---|---|---|---|---|---|
| 17-7B | 10570 | 1281 | 6.909 | none | solid gel, easily sliceable | Na-caseinate | Sigma apple pectin |
| 17-25 | 13530 | 2504 | 10.48 | none | hard gel, firmest of all | Soy isolate (Supro Ex 38) | Sigma apple pectin |
| 17-35 | 17390 | 2380 | 7.79 | none | medium firm gel | Na-caseinate | Genu Pectin Type X-916-02 |
| 17-36 | 24400 | 3889 | 9.056 | none | medium firm and smooth gel | Na-caseinate | Genu Pectin Type LM-18 CG-Z |
| 17-49 | | | | none | very soft gel | Supro EX 38 | Tobacco pectin (undialyzed) |
| 17-13 | 32960 | 5850 | 10.06 | none | firm gel, can be cut, lot of syneresis | Lysozyme | Sigma apple pectin |
| 17-31 | 10810 | 1173 | 6.893 | none | firm, can be sliced, no syneresis | Whey protein isolate | Sigma apple pectin |

These results indicate that the use of pectin as the polysaccharide without the use of a metal ion gelation or crosslinking agent can provide firm gels having sufficient strength to be cut, and therefore provides coacervation results that are as good as, or better than, those obtained using κ-carrageenan and a calcium lactate gelation agent. In addition, the use of pectin avoids the preparation of a separate carrageenan solution, which can be viscous and difficult to handle.

In addition to preparing a polysaccharide/protein coacervate using a pectin as the polysaccharide, as indicated in the examples above, it is possible to produce a coated plant material product using a mixture of polysaccharides. In a particular embodiment, the polysaccharide mixture may be a mixture of pectins, such as a mixture of tobacco pectin and another pectin, for example a commercial pectin, e.g., Genu pectin. Alternatively, in another particular embodiment, the mixture of polysaccharides may include a mixture of a pectin and another polysaccharide, such as a carrageenan, such as κ-carrageenan. The additional polysaccharide can generally be added in an amount ranging from about 15 to about 50 wt %, more particularly from about 30 to about 50 wt %, of the total polysaccharide content of the particles. Non-limiting examples of mixtures of coacervate gel coatings of particles of plant material using a mixture of polysaccharides are provided below. These materials were also subjected to the rheological testing described above, and the results provided in Table 3 below.

When using more than one polysaccharide, different preparation processes are available. In one embodiment, the polysaccharides are added to the protein-tobacco particle dispersion all at once. In another embodiment, the polysaccharides are added in a step-wise fashion. In a particularly preferred embodiment, the polysaccharide that forms a weaker gel or that gels less efficiently (e.g., tobacco pectin) is introduced to the protein-tobacco particle dispersion first, and the stronger gelling polysaccharide (e.g., κ-carrageenan or low ester pectin) is introduced subsequently. Without wishing to be bound by any theory, it is believed that the step-wise introduction of the polysaccharides allows the weaker gelling agent to form a complex coacervate with the protein, forming an inner shell, while the stronger gelling agent forms an outer gel layer, and propagates gel formation through the bulk of the gel surrounding the particle. Increasing the amount of more efficient gelling agent, (e.g., κ-carrageenan, curdlan, agar, starches, cellulosics, locust bean or other gums, etc.) can have a significant effect on increasing gel strength when the coacervate is produced by using this process.

The rheological data provided in Table 3 below suggests that the stepwise addition of gelling agents can provide increased gel strength in the resulting coacervate while making use of polysaccharides originating from tobacco. Nevertheless, it is also believed that the addition of the polysaccharides simultaneously can permit both types of polysaccharide to randomly compete with each other for complexation sites with the protein, and that this may somehow increase the overall gel strength of the coacervate, as indicated in Table 3 for Samples 17-62, 17-63, and 17-89. In addition, mixing the polysaccharides with the protein-tobacco particle suspension all at once can provide handling advantages, since the need to make and handle the viscous carrageenan solution separately is avoided.

Irrespective of the particular process used, the incorporation of a more efficient gelling agent with pectins that may be otherwise too low in molecular weight or have an insufficient degree of esterification can allow these pectins to be used effectively in a coacervate coating of protein-coated plant particles. In particular, the processes described herein can improve the gelation of tobacco pectin or other pectin having a lower molecular weight by the addition of a second polysaccharide in an amount ranging between about 15 wt % and about 50 wt %, more particularly between about 30 wt % and about 50 wt %, of the total carbohydrate content.

Example 13

A soy isolate/pectin coacervate gel encapsulated tobacco powder was prepared by dispersing in 91 g of deionized water 0.91 g of soy isolate (Solae company, Supro EX 38) as the protein, using a high shear Silverson mixer. 6.4 g of 400 mesh pasteurized ground burley tobacco was then dispersed into the protein mixture using the high shear mixer. 5.7 g of 0.5 M citric acid solution (Sigma, 99% pure) was then added to adjust the pH of the mixture to 4.2. 1.82 g of tobacco sourced pectin (undialyzed) as the polysaccharide was added slowly to deionized water heated to a temperature of 70-85° C. with continuous stirring, until all of the pectin was dissolved. The resulting pectin solution was then added to the protein-tobacco dispersion under high shear for over 20 minutes. The temperature of the dispersion was allowed to equilibrate with a water bath at 70-90° C. for 1-3 hours. 1 g of 0.153 M calcium lactate solution (Sigma, 90%) was then added, and the resulting dispersion was removed from the water bath and refrigerated for 24 hours. The resulting gel dispersion was homogenized with deionized water and then spray dried using a spray drier having an inlet temperature of 200° C. and an outlet temperature of 110° C. The resulting encapsulated particles were collected in a sample collector, and designated Sample 17-60 in Table 3 below.

Example 14

A soy isolate/tobacco pectin/carrageenan coacervate gel encapsulated tobacco powder was prepared by following the procedure described above for Example 13, with the following variations. 8.96 g of 0.5 M citric acid solution (Sigma, 99% pure) was used to adjust the pH to 4.2. 1.27 g of tobacco sourced pectin (undialyzed) was added to deionized water heated to a temperature of 70-85° C. with continuous stirring. Heating was continued until the pectin was dissolved. 0.55 g of κ-carrageenan (FMC Biopolymers Gelcarin 911 NF) was added slowly to the pectin solution with heating. This combination was then added to the soy isolate-tobacco dispersion under high shear over 20 minutes. The temperature of the dispersion was allowed to equilibrate with a water bath at 70-90° C. for 1-3 hours. The dispersion was then removed from the bath, and 0.08 g of 0.5 M KCl (ACS grade, Fisher) solution and 1 g of 0.153 M Calcium lactate solution (Sigma, 90%) were added, and the resulting solution was refrigerated for 24 hours. The resulting gel was homogenized with excess deionized water and spray dried using a spray drier having an inlet temperature of 200° C. and an outlet temperature of 110° C. The resulting encapsulated particles were collected in a sample collector, and designated Sample 17-62D in Table 3 below.

Example 15

A soy isolate/tobacco pectin/carrageenan coacervate gel encapsulated tobacco powder was prepared by following the procedure described above in Example 14, with the following variations. The tobacco sourced pectin was first dissolved in deionized water, this solution was added to the protein-tobacco dispersion under high shear mixing for 20 minutes, and equilibrated with a water bath at 60-90° C. for 1-3 hours. The κ-carrageenan was added, mixed in, and the resulting dispersion was allowed to equilibrate in a water bath at 60-90° C. for 1-3 hours. The batch was removed from the water bath, and the KCl and calcium lactate added, the resulting dispersion was refrigerated for 24 hours, and the resulting gel homogenized, spray dried, and collected, as described above for Example 14. The resulting material was designated Sample 17-62B in Table 3 below.

Example 16

A soy isolate/tobacco pectin/carrageenan coacervate gel encapsulated tobacco powder was prepared by following the procedure described in Example 15, with the following variations. 0.91 g of tobacco sourced pectin (undialyzed) and 0.91 g of κ-carrageenan (FMC Biopolymers Gelcarin 911 NF) were used. The resulting material was designated Sample 17-63B in Table 3 below.

Example 17

A soy isolate/tobacco pectin/carrageenan coacervate gel encapsulated tobacco powder was prepared by following the procedures described above in Example 14, with the following variations. 0.91 g of tobacco sourced pectin (undialyzed) and 0.91 g of κ-carrageenan (FMC Biopolymers Gelcarin 911 NF) were used. The resulting material was designated Sample 17-63D in Table 3 below.

Example 18

A soy isolate/tobacco pectin/commercial pectin coacervate gel encapsulated tobacco powder was prepared by following the procedures described above for Example 14, with the following variations. 0.91 g of low ester (~40%) pectin (Genu pectin LM18 CG-Z from CP Kelco, non-standardized) was used in place of the κ-carrageenan, and the 0.5 M KCl was not used. The resulting material was designated Sample 17-89 in Table 3 below.

Example 19

A soy isolate/tobacco pectin/commercial pectin coacervate gel encapsulated tobacco powder was prepared by following the procedures described above for Example 15, with the following variations. 0.91 g of low ester (~40%) pectin (Genu pectin LM18 CG-Z from CP Kelco, non-standardized) was used instead of κ-carrageenan, and the 0.5 M KCl was not used. The resulting material was designated Sample 17-88D in Table 3 below.

Example 20

A soy isolate/tobacco pectin/commercial pectin coacervate gel encapsulated tobacco powder was prepared by following the procedures described above for Example 15, with the following variations. The calcium lactate salt was not added. The resulting material was designated Sample 17-88E in Table 3 below.

TABLE 3

Rheological Data on Protein-Carbohydrate Coacervate Gels at 1 Hz, 0.1% Strain

| Sample # | G' (GPa) | G" (GPa) | δ | Ca salt (g) | Visual observations | Carbohydrate |
|---|---|---|---|---|---|---|
| 17-92 | 33770 | 2993.3 | 5.063 | 0.32 | Firm gel that can be cut | κ-carrageenan |
| 17-60 | 6341 | 1034 | 9.259 | 1 | Very soft gel, cannot be cut without collapsing | 100% tobacco pectin (unwashed) |
| 17-61 | 3419 | 504.5 | 8.395 | 1 | Soft, smooth, custard-like gel; improved strength over gel made from 100% tobacco pectin | 85% tobacco pectin (unwashed), 15% κ-carrageenan |

TABLE 3-continued

Rheological Data on Protein-Carbohydrate Coacervate Gels at 1 Hz, 0.1% Strain

| Sample # | G' (GPa) | G" (GPa) | δ | Ca salt (g) | Visual observations | Carbohydrate |
|---|---|---|---|---|---|---|
| 17-62 | 7048 | 877.7 | 7.099 | 1 | Medium hardness gel which can be cut; ; polysaccharides mixed together before adding to protein tobacco dispersion | 70% tobacco pectin (unwashed), 30% κ-carrageenan |
| 17-62B | 12427 | 1466 | 6.725 | 1 | Medium hardness gel which can be cut without collapsing; first polysaccharide added to protein tobacco dispersion, second polysaccharide added later. | 70% tobacco pectin (unwashed), 30% κ-carrageenan |
| 17-62D | 11053 | 1331 | 6.855 | 1 | Medium hardness gel which can be cut without collapsing; polysaccharides mixed together before adding to protein tobacco dispersion | 70% tobacco pectin (unwashed), 30% κ-carrageenan |
| 17-63 | 9782 | 1116 | 6.507 | 1 | Firm gel that can be cut without collapsing; polysaccharides mixed together before adding to protein tobacco dispersion | 50% tobacco pectin (unwashed), 50% κ-carrageenan |
| 17-63D | 19783 | 2104 | 6.087 | 1 | Firm gel that can be cut without collapsing; polysaccharides mixed together before adding to protein tobacco dispersion | 50% tobacco pectin (unwashed), 50% κ-carrageenan |
| 17-63B | 26700 | 2825.33 | 6.192 | 1 | Firm gel that can be cut without collapsing; first polysaccharide added to protein tobacco dispersion, second polysaccharide added later | 50% tobacco pectin (unwashed), 50% κ-carrageenan |
| 17-87 | | | | 1 | Very soft gel that cannot be cut without collapsing | 85% tobacco pectin (unwashed), 15% Genu pectin LM 18-CG-Z |
| 17-88 | | | | 1 | Very soft gel that cannot be cut without collapsing; polysaccharides mixed together before adding to protein tobacco dispersion | 70% tobacco pectin (unwashed), 30% Genu pectin LM 18-CG-Z |
| 17-88D | 3552.5 | 484.85 | 7.7645 | 1 | Soft fragile gel but can be cut without collapsing; first polysaccharide added to protein tobacco dispersion, second polysaccharide added later | 50% tobacco pectin (unwashed), 50% Genu pectin LM 18-CG-Z |
| 17-88E | 3508 | 463.6 | 7.477 | None | Soft fragile gel but can be cut without collapsing; first polysaccharide added to protein tobacco dispersion, second polysaccharide added later | 50% tobacco pectin (unwashed), 50% Genu pectin LM 18-CG-Z |
| 17-89 | | | | 1 | Very soft gel that cannot be cut without collapsing; polysaccharides mixed together before adding to protein tobacco dispersion | 50% tobacco pectin (unwashed), 50% Genu pectin LM 18-CG-Z |

TABLE 3-continued

Rheological Data on Protein-Carbohydrate Coacervate Gels at 1 Hz, 0.1% Strain

| Sample # | G' (GPa) | G" (GPa) | δ | Ca salt (g) | Visual observations | Carbohydrate |
|---|---|---|---|---|---|---|
| 17-90 | 10164 | 1049.8 | 5.854 | 1 | Very smooth gel of medium firmness that can be cut without collapsing | 50% Sigma apple pectin, 50% κ-carrageenan |
| 17-91 | 8227 | 1051.5 | 7.286 | None | Gel of medium firmness (but less firm than 17-90), and that can be cut without collapsing | 50% Sigma apple pectin, 50% Genu pectin LM 18-CG-Z |

Higher molecular weight pectins, such as Sigma apple pectin, tend to form gels of high to medium strength when combined with polysaccharides such as carrageenans. Mixed polysaccharide systems containing tobacco pectin and κ-carrageenan, or tobacco pectin and alginate, or tobacco pectin and gellan gum, or tobacco pectin and agar, or tobacco pectin and curdlan tend to provide better gelling coacervates than do systems containing tobacco pectin and other commercial pectins, or systems containing commercial pectins and carrageenans. For example, Samples 17-62 and 17-63 (using tobacco pectin/κ-carrageenan) provided improved results, in terms of gel strength and sensory perception, compared to Samples 17-87, 17-88, and 17-89, which contained tobacco pectin and commercial pectin.

Mixed polysaccharide complex coacervate gelation differed from simple biopolymer gelation, such as simple pectin gelation, in that an optimum value or range for ionic strength appears to result from competing mechanisms of coacervate formation under low ionic strength and pectin gelation in the presence of relatively higher concentrations of calcium salts. As a result, increasing ionic strength by adding more salt (beyond about 0.08 to about 0.3 g 0.5 M KCl and 1-5 g of 0.153 M calcium lactate per approximately 100 ml, as used in the Examples) does not necessarily lead to an improvement in gel strength.

A strong coacervate gel provides good encapsulation efficiency, which in turn provides an enhanced ability to form products such as compressed tobacco tablets made from such encapsulated powders, as indicated in the following examples.

Example 21

Raw, uncoated tobacco particles, without any binders were pressed in a tablet press into round disc tablets of 250 mg and having a diameter of 13 mm. Disintegration studies were conducted in a Sotax DT2 disintegration unit, consisting of two basket-rack assemblies, two 1000 ml beakers containing deionized water. The water was heated to roughly 37±2° C. in order to approximate the body temperature of a consumer of the tablet. A tablet was placed into each of six tubes in the basket, immersed in the water, and observed visually for disintegration into smaller pieces which can pass through the 10 mesh screen of the basket assembly. Complete disintegration was deemed to have been achieved when any residue of the tablet remaining on the screen was a soft mass having no palpably firm core. The results of the study are provided below in Table 4

Example 22

The procedures of Example 21 were followed, with the following variations. The tablets were formed from tobacco particles coated with soy protein and κ-carrageenan and crosslinked with KCl and calcium lactate, having a tobacco content of about 63% by weight. The results are provided below in Table 4.

Example 23

The procedures of Example 21 were followed, with the following variations. The tablets were formed from tobacco particles coated with soy protein and κ-carrageenan and crosslinked with calcium lactate, having a tobacco content of about 65.9% by weight. The results are provided below in Table 4.

Example 24

The procedures of Example 21 were followed, with the following variations. The tablets were formed from tobacco particles coated with soy protein and tobacco pectin and crosslinked with calcium lactate, having a tobacco content of about 66% by weight. The results are provided below in Table 4.

Example 25

The procedures of Example 21 were followed, with the following variations. The tablets were formed from tobacco particles coated with soy protein and a polysaccharide mixture of 50% tobacco pectin and 50% κ-carrageenan, and crosslinked with calcium lactate, having a tobacco content of about 65.4% by weight. The results are provided below in Table 4.

TABLE 4

| Ex # | Avg. disint. time (m:ss) | Std. dev. | % rel. std. dev. | # reps. | Tobacco content (wt %) | Protein | Polysaccharide | G' (Pa) | G" (Pa) |
|---|---|---|---|---|---|---|---|---|---|
| 21 | 06:18 | 00:33 | 8.6 | 12 | 100 | None | None | | |
| 22 | 13:07 | 00:57 | 7.2 | 9 | 63 | Soy protein | κ-carrageenan | 24770 | 2256 |

TABLE 4-continued

| Ex # | Avg. disint. time (m:ss) | Std. dev. | % rel. std. dev. | # reps. | Tobacco content (wt %) | Protein | Poly-saccharide | G' (Pa) | G" (Pa) |
|---|---|---|---|---|---|---|---|---|---|
| 23 | 12:50 | 01:20 | 10.5 | 12 | 65.9 | Soy protein | κ-carrageenan | 33770 | 2993 |
| 24 | 4:59 | 00:14 | 4.6 | 9 | 66 | Soy protein | tobacco pectin | 6341 | 1034 |
| 25 | 10:49 | 00:58 | 9.0 | 12 | 65.4 | Soy protein | 50% tobacco pectin, 50% κ-carrageenan | 26700 | 2825 |

Tablets made from raw, uncoated tobacco particles and particles coated with a protein and tobacco pectin coacervate have shorter disintegration times (typically around 5-6 minutes). Tablets made with tobacco particles coated with a protein and κ-carrageenan coacervate have longer disintegration times (typically around 12-13 minutes). Tablets coated with a protein and tobacco pectin/κ-carrageenan coacervate had disintegration times of around 10 minutes. This illustrates that inclusion of tobacco pectin in the encapsulating gel still provides a disintegration time on the order of that obtained for a protein and κ-carrageenan coacervate, allowing the use of tobacco derived pectin in the preparation of coated tobacco particles.

In addition to preparation as tablets, as described above, the coated particles described herein may be incorporated into a variety of products, in particular, smokeless products containing tobacco or tobacco substitutes, and it will be understood that the tobacco particles used herein can, in whole or in part, be replaced by particles of plant material suitable as a tobacco substitute. Examples of smokeless products wherein the disclosed coated particles can be used include pouched products, snuff, snus, and the like. The particles can be pressed into shaped forms with or without an acceptable binder, or can be introduced in loose form, e.g., within a pouch wrapper or membrane. The coacervate coating can provide delayed release of the flavor of the plant material, desirably tobacco flavor, and be varied in thickness to provide a flavor release profile over time. For example, thin or uncoated particles can be mixed with particles having a relatively thin coating, particles having a coating of intermediate thickness, and particles having a thicker coating, in order to provide immediate, short term, and longer term release of the flavor of the plant material.

While various methods and products have been described herein with reference to specific embodiments, variations and modifications may be made without departing from the spirit and the scope of the appended claims. Such variations and modifications are to be considered within the purview and scope of the invention as defined by the appended claims.

What is claimed is:

1. A process for preparing coated tobacco particles suitable for usage in a smokeless tobacco product, comprising:
   (a) combining finely-divided particles of tobacco with one or more proteins in a liquid medium, under conditions effective to adsorb the protein onto at least a portion of a surface of the finely-divided particles of tobacco to form a first layer; and
   (b) mixing one or more polysaccharide compositions comprising a pectin and a carrageenan with the liquid medium under conditions effective to adsorb at least some of the pectin onto at least a portion of a surface of the first layer to form a second layer, to form a coacervate of coated particles of tobacco and a depleted liquid medium,
   wherein the resulting coacervate of coated tobacco particles has a color lighter than raw tobacco and when placed in the mouth are capable of swelling upon contact with saliva to provide a pleasant in-mouth feel and the release of tobacco flavor.

2. The process for preparing coated tobacco particles suitable for use in a smokeless tobacco product of claim 1, wherein:
   (i) said one or more proteins comprises at least one protein selected from the group consisting of milk protein, whey protein, soy protein, wheat protein, rice protein, egg white protein, protein obtained from tobacco, gelatin, and protein hydrolyzates; and/or
   (ii) said one or more proteins comprises a Zwitterionic or positively charged protein.

3. The process for preparing coated tobacco particles suitable for use in a smokeless tobacco product of claim 1, wherein:
   said pectin comprises at least one pectin obtained from tobacco, apples, citrus peel, plums, or gooseberries.

4. The process for preparing coated tobacco particles suitable for use in a smokeless tobacco product of claim 1, wherein said coated tobacco particles comprise κ-carrageenan in an amount from about 10% to about 60% by weight of total polysaccharides in said first and second layers.

5. The process for preparing coated tobacco particles suitable for use in a smokeless tobacco product of claim 4, further comprising adsorbing at least some of said κ-carrageenan onto at least a portion of a surface of the second layer to form a third layer.

6. The process for preparing coated tobacco particles suitable for use in a smokeless tobacco product of claim 1, wherein said pectin is mixed with the liquid medium prior to mixing a second polysaccharide with the liquid medium.

7. The process for preparing coated tobacco particles suitable for use in a smokeless tobacco product of claim 1, wherein said pectin has a Huggins coefficient of between about 0.6 and 0.9.

8. The process for preparing coated tobacco particles suitable for use in a smokeless tobacco product of claim 1, wherein:
   (i) said coated tobacco particles have a δ of from about 5 to about 11, and/or
   (ii) said coated tobacco particles have a G' of from about 10,000 Pa to about 35,000 Pa.

9. The process for preparing coated tobacco particles suitable for use in a smokeless tobacco product of claim 1, further comprising (c) drying said coated tobacco particles by removing at least a portion of said depleted liquid medium.

10. The process for preparing coated tobacco particles suitable for use in a smokeless tobacco product of claim 1, further comprising inducing gelation by (i) adjusting a pH of said liquid medium;
(ii) adding monovalent, divalent, or trivalent cations to said liquid medium;
(iii) heating to a temperature of between about 60° C. and about 90° C. for about 1 to about 3 hours;
(iv) cooling to a temperature of between about 20° C. and about 0° C. for about 1 to about 48 hours; or
(v) two or more of the above.

11. A coated tobacco particle suitable for use in a smokeless tobacco product, comprising:
a base tobacco particle;
a first layer at least partially coating the base particle, the first layer comprising a protein; and
a second layer at least partially coating the first layer, the second layer comprising a polysaccharide composition including a pectin,
wherein the resulting coated tobacco particle has a color lighter than a raw tobacco particle and when placed in the mouth upon is capable of swelling upon contact with saliva to provide a pleasant in-mouth feel and a release of tobacco flavor.

12. The coated tobacco particle that is suitable for use in a smokeless tobacco product of claim 11, wherein said polysaccharide composition comprises a second polysaccharide and said pectin comprises a pectin derived from tobacco.

13. The coated tobacco particle that is suitable for use in a smokeless tobacco product of claim 11, wherein:
(i) said base tobacco particle has a largest dimension of less than about 3 mm;
(ii) said coated particle comprises:
  (a) tobacco in an amount of about 10 to about 90% by dry weight,
  (b) first layer in an amount of about 1% to about 20% by dry weight, and/or
  (c) second layer in an amount of about 5% to about 50% by dry weight;
(iii) the coated base tobacco particle has a moisture content of less than about 15% by weight;
(iv) the coated tobacco particle has a net negative or neutral charge; or
(v) combinations of two or more of (i) to (iv).

14. A process for preparing coated tobacco particles suitable for usage in a smokeless tobacco product, comprising:
combining finely-divided particles of tobacco simultaneously with one or more proteins and with one or more polysaccharide compositions comprising a pectin in a liquid medium, under conditions effective to adsorb the protein onto at least a portion of a surface of the finely-divided particles of tobacco to form a first layer, and effective to adsorb at least some of the pectin onto at least a portion of a surface of the first layer to form a second layer, to form a coacervate of coated particles of tobacco and a depleted liquid medium,
wherein the resulting coacervate of coated tobacco particles has a color lighter than raw tobacco and when placed in the mouth are capable of swelling upon contact with saliva to provide a pleasant in-mouth feel and the release of tobacco flavor.

15. The process for preparing coated tobacco particles suitable for use in a smokeless tobacco product of claim 1, wherein said coated tobacco particles comprise κ-carrageenan in an amount from about 30% to about 50% by weight of total polysaccharides in said first and second layers.

16. The process for preparing coated tobacco particles suitable for use in a smokeless tobacco product of claim 1, wherein said pectin comprises at least one pectin obtained from tobacco.

17. The process for preparing coated tobacco particles suitable for use in a smokeless tobacco product of claim 1, wherein said carrageenan comprises κ-carrageenan.

* * * * *